March 28, 1944.   L. H. AMRINE   2,345,371
INSERT FOR MOLDED ARTICLES
Filed Nov. 10, 1941
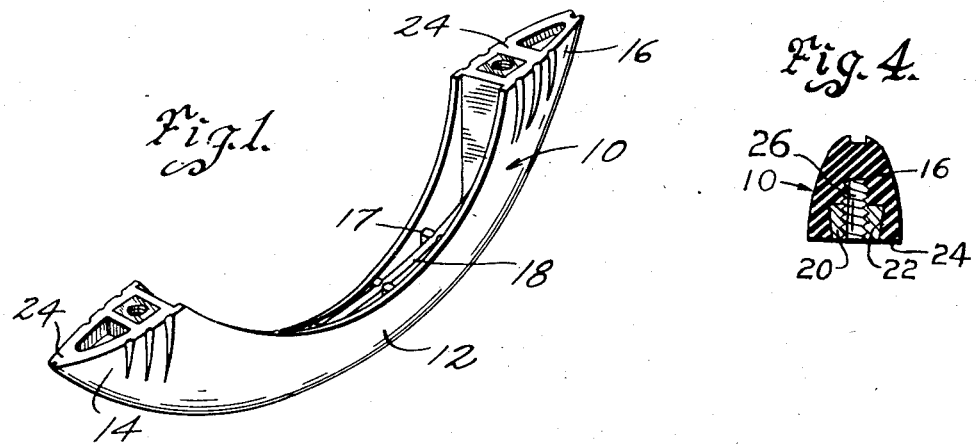
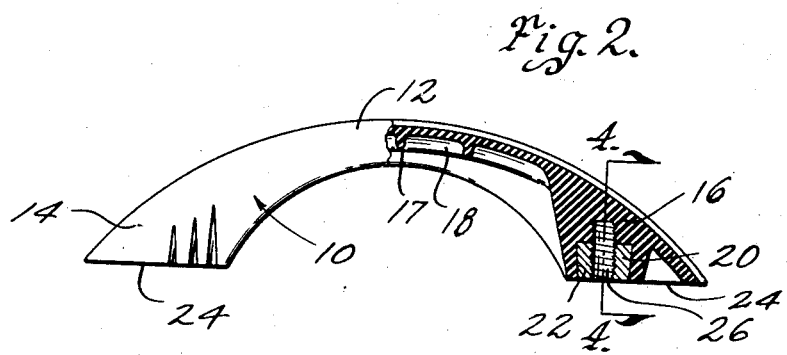
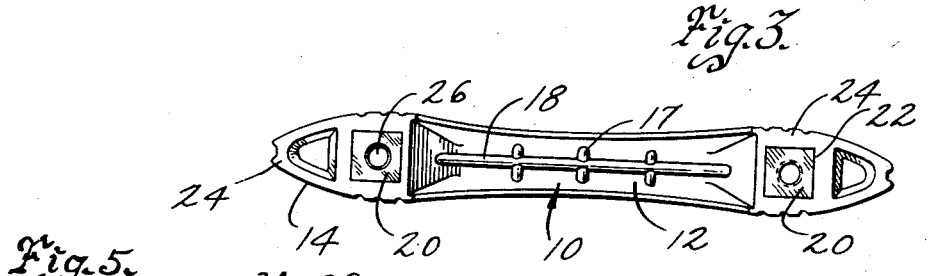
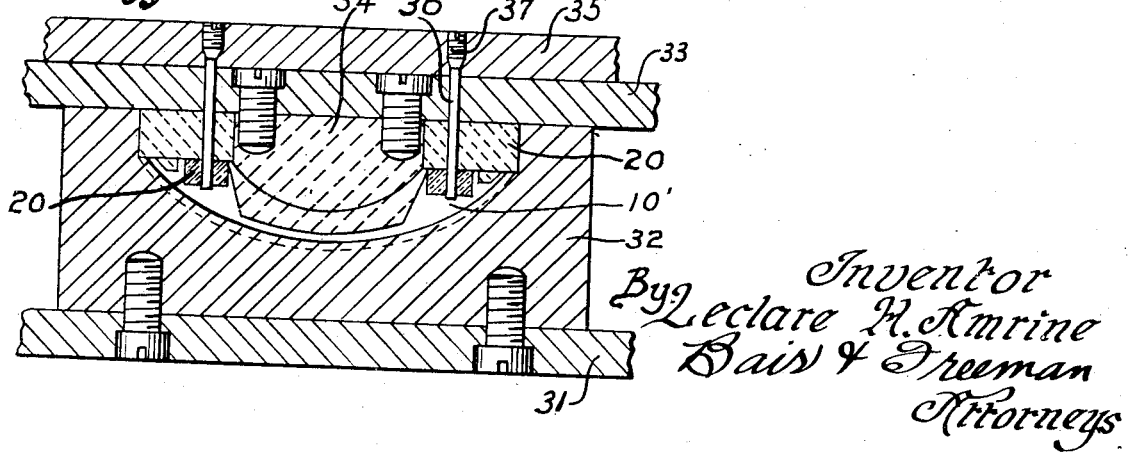
Inventor
Leclare H. Amrine
Bair & Freeman
Attorneys Patented Mar. 28, 1944

2,345,371

UNITED STATES PATENT OFFICE 2,345,371

INSERT FOR MOLDED ARTICLES

Leclare H. Amrine, Chicago, Ill., assignor to Imperial Molded Products Corporation, Chicago, Ill., a corporation of Illinois Application November 10, 1941, Serial No. 418,471

6 Claims. (Cl. 18—59)

My invention relates to molded articles of the kind frequently referred to as plastics wherein material such as a powdered or plastic compound is molded under heat and pressure, or both, in order to form a strong, rigid and relatively smooth surfaced molded article.

Among the objects of my device is to provide a new and improved type of insert for molded articles of this kind which will permit attaching the article to some object by means of a screw.

Also among the objects of my invention is to provide a new and improved type of insert for molded articles which will replace the metallic inserts previously used with an insert of substantially softer composition, non-metallic in nature which can be readily molded into the article and which after molding, has sufficient rigidity and tensile strength to provide a threaded connection for a metal bolt or a machine screw.

With these and other objects in view, my invention consists in the construction, arrangement and combinations of the various parts of my apparatus and in the practice of my methods, whereby the objects contemplated are attained, as hereinafter more fully set forth, pointed out in my claims, and illustrated in the accompanying drawing, in which:

Figure 1 is a perspective view of a molded handle showing the new and improved insert positioned therein;

Figure 2 is an elevational view partially in section showing the insert;

Figure 3 is a bottom plan view of the handle showing the insert; and

Figure 4 is a cross sectional view showing the insert taken on the line 4—4 of Figure 2.

The material used to make handles and other objects requiring an insert of the sort herein described are customarly the thermoplastic or thermosetting compounds known by a variety of trade names, such as, "Plaskon", "Bakelite," "Durez" and the like. The thermoplastic compounds are characterized by their becoming somewhat plastic on reheating after being given a final shape, while the thermosetting compounds are characterized by a finished consistency which is rigid and relatively brittle and which retains this consistency even though reheated to a substantially high temperature. Heretofore, it has been customary to use metal inserts when it is desired to provide threaded holes in molded articles of these kinds, the threaded insert being molded with the article. Due to the fact that metals for the inserts such as brass and similar alloys are not always readily available, it is frequently necessary to provide some means of incorporating threaded apertures into molded articles without the use of metal. When threads are made in molded material of the kind herein described, they have been found to be ineffective. If it be a thermoplastic material, the threaded portion tends to give away when the material is heated. If it be a thermosetting material, it usually has such brittle characteristics that the threads tend to chip and permit the machine screw to be torn out. In order to avoid these difficulties and to produce a suitable thread, the applicant has resorted to the new and improved construction herein described.

A handle 10 of plastic material is shown having an arched central portion 12 and enlarged ends 14 and 16. The central portion is made hollow in construction so as to keep the piece light and is provided with lateral ribs 17 and a longitudinal rib 18.

The ends 14 and 16 are made relatively solid so as to provide the necessary body of material for the threaded portion of the device.

Plastic objects of this kind are customarily molded under heat and pressure. During the molding process, an insert 20 is placed in the mold in proper position. Customarily the insert is of a compact fibrous material or some similar compact non-metallic material initially drilled so that it can be located by means of a peg in the mold. Normally, the peg extends through the aperture in the insert and partially into the body of the material forming the molded handle. Likewise, it may be preferable to form the insert such that the cross sectional area at the upper end, as viewed in Figures 2 and 4, is larger than the cross sectional area at the lower end so that the insert cannot easily be pulled out of the molded piece. It is likewise preferable to make the lateral surfaces 22 of the insert somewhat roughened in order that they may more readily adhere to the surrounding plastic material. When the insert is in place in the molded article, a surface 24 will be exposed and flush with the corresponding surface of the molded article.

Customarily, after the article has been withdrawn from the mold, the aperture in the insert is tapped as is likewise the aperture in the body of the handle, thereby forming continuous threads 26. Normally, the apertures in both the insert and the body of the handle are made of such cross sectional dimension that there will be a full depth of thread after the tapping operation.

When a machine screw is threaded into the apertures, it will rigidly engage the somewhat hard and brittle material of the handle at the inside end and likewise engage the material of the non-metallic insert near the outer end and by this combination of anchoring means provide a firm and lasting connection. Moreover, by reason of the fact that the material of the insert is confined, it is frequently possible to use a relatively soft material which permits easy threading without any sacrifice in tensile strength.

To better illustrate the manner of locating the non-metallic insert, there is shown in the sectional view of the mold in Figure 5, a conventional bottom plate 31 and a cavity die 32 secured to it having a cavity 10' therein, conforming to the shape of the handle 10. A punch plate 33 carries a punch 34 which enters the cavity 10' and closes the upper side. A pin plate 35 fits over the punch plate and has attached thereto socket head screws 37, from which a peg portion 36 extends downwardly through the punch plate and into the mold cavity 10'. A hole in each of the inserts 20 fits snugly over the respective peg portion so that the insert will stay in place while the plastic is placed in the mold. The pegs may extend beyond the inserts into the mold cavity when desired, so as to mold an extension of the hole in the insert which may be later tapped.

There has thus been provided a non-metallic insert for plastic articles which has essentially all of the advantages of a metal insert and which can readily be substituted for metallic inserts when such inserts are not available, the non-metallic insert being made of easily procured and relatively inexpensive materials.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

1. In a molded handle composed of non-metallic material having an initially plastic consistency during the molding process and having a rigid homogeneous consistency in final form the combination of an insert of dense fibrous-like material relatively softer than said non-metallic material, non-circular in cross section and having an aperture extending therethrough embedded and confined laterally within the handle with a face at one end exposed, said handle having an aperture extending part way through in axial alignment with the aperture in the insert, said apertures having a continuous screw thread for reception of a screw inserted into the handle.

2. In a molded handle composed of non-metallic material having an initially plastic consistency during the molding process and having a rigid homogeneous consistency in final form the combination of an insert of dense fibrous-like yieldable material relatively less rigid than said non-metallic material, said insert being non-circular in cross section, larger in cross section at one end than at the other end having an aperture extending therethrough, said insert being embedded and confined laterally within the handle with a face at the end of smaller cross section exposed, said aperture having a continuous screw thread providing non-rigid threads for reception of a screw inserted into the handle.

3. In a molded handle composed of non-metallic material having an initially plastic consistency during the molding process and having a rigid homogeneous consistency in final form the combination of an insert of dense fibrous-like material relatively softer than said non-metallic material and non-circular in cross section having an aperture extending therethrough, said insert being larger in cross section at one end than at the other and embedded and confined laterally within the handle with a face at the end of smaller cross section exposed, said handle having an aperture extending part way through in axial alignment with the aperture in the insert, said apertures having a continuous screw thread for reception of a screw inserted into the handle providing thereby a set of threads partly non-rigid and partly rigid in physical consistency.

4. In a molded handle composed of non-metallic material having an initially plastic consistency during the molding process and having a homogeneous consistency of relatively great rigidity in final form the combination of an insert of dense non-metallic material relatively softer than said first non-metallic material non-circular in cross section and having an aperture extending therethrough, said insert being larger in cross section at one end than at the other and having a roughened surface on the exterior portions embedded in the handle and a face at the end of smaller cross section exposed, said handle having an aperture extending part way through in axial alignment with the aperture in the insert, said apertures having a continuous screw thread providing relatively soft threads at the outer end and relatively hard threads at the inner end for reception of a screw inserted into the handle.

5. In a molded handle composed of non-metallic material having an initially plastic consistency during the molding process and having a brittle homogeneous consistency of relatively great rigidity in final form the combination of an insert of dense non-metallic material relatively softer and non-rigid in consistency having in finished form an aperture extending therethrough, said insert having a roughened surface on the exterior portions embedded in the handle and a face at one end thereof exposed, said handle having an aperture extending part way through in axial alignment with the aperture in the insert, said apertures having a continuous screw thread for reception of a screw inserted into the handle.

6. A method of molding plastic articles having inserts therein comprising preparing a non-metallic insert of tough material having relatively great tensile strength characterized by an absence of rigidity and brittleness by shaping said insert into a form non-circular in cross section, roughening the outer surfaces and extending a longitudinal, substantially round hole therethrough, locating the insert in a mold having a relatively round inwardly projecting portion of greater length than the depth of the hole by application of the hole over said inwardly projecting portion of the mold, depositing molding material in the mold and around said projecting portion and said insert, applying heat and pressure to the material in the mold, thereby forcing said material onto the roughened surface of said insert and compressing the material of said insert around the projecting portion, rendering said material stiff and rigid thereby forming rigid laterally confining walls for said insert, removing said mold and projecting portion leaving a round aperture extending continuously through the insert and into the molded material and then tapping the round aperture in both said insert and the molded article to produce a continuous thread wherein the outer threads are of non-rigid and the inner threads are of rigid consistency.

LECLARE H. AMRINE.